(12) United States Patent
Kawakami

(10) Patent No.: US 6,792,825 B2
(45) Date of Patent: Sep. 21, 2004

(54) BICYCLE SHIFT CONTROL DEVICE

(75) Inventor: Tatsuya Kawakami, Osaka (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 09/892,456

(22) Filed: Jun. 28, 2001

(65) Prior Publication Data

US 2003/0000333 A1 Jan. 2, 2003

(51) Int. Cl.$^7$ .................................................. F16C 1/10
(52) U.S. Cl. ........................................................ 74/502.2
(58) Field of Search ........................... 74/502.2, 500.5, 74/501.6, 473.3, 473.13, 473.14, 473.15, 501, 512, 502.6; F16M 1/00; B62K 23/00, 23/04; B62M 25/04, 25/00; B60U 10/00; F16C 1/10

(56) References Cited

U.S. PATENT DOCUMENTS

| | | | | |
|---|---|---|---|---|
| 4,885,219 A | * | 12/1989 | Miller ......................... | 429/99 |
| 4,908,482 A | * | 3/1990 | Shimirak et al. ............. | 174/93 |
| 4,966,047 A | * | 10/1990 | Krauer et al. ................. | 74/489 |
| 5,134,897 A | * | 8/1992 | Romano .................. | 74/473.13 |
| 5,331,506 A | * | 7/1994 | Nakajima .................... | 361/683 |
| 5,354,968 A | * | 10/1994 | Yamamura .................. | 219/268 |
| 5,443,134 A | * | 8/1995 | Gajek et al. ............... | 188/2 D |
| 5,701,786 A | * | 12/1997 | Kawakami .................... | 74/489 |
| 6,067,875 A | * | 5/2000 | Ritchey et al. ............ | 74/502.2 |

FOREIGN PATENT DOCUMENTS

| | | | | |
|---|---|---|---|---|
| DE | 19922327 A1 | 11/2000 | | |
| GB | 2223 132 A | * | 3/1990 | ............ H01R/4/24 |

* cited by examiner

Primary Examiner—Chong H. Kim
(74) Attorney, Agent, or Firm—Shinjyu Global IP Counselors, LLP.

(57) ABSTRACT

A cable operated bicycle shift control device has an outer casing with a cable receiving bore and an access opening for accessing a cable operated winding mechanism to perform maintenance such as replacement of the cable. The cable operated winding mechanism is disposed in the outer casing such that its cable attachment point is disposed relative to the access opening to be accessible from the access opening. A maintenance cover movably is coupled to the outer casing between a closed position overlying the access opening and an open position exposing the access opening.

15 Claims, 6 Drawing Sheets

BICYCLE SHIFT CONTROL DEVICE

BACKGROUND OF THE INVENTION

1. Field of the Invention

This invention generally relates to a bicycle shift control device. More specifically, the present invention relates a cable operated bicycle shift control device that has an access opening for accessing the interior of the bicycle shift control device to perform maintenance.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

For example, the front and rear shift control devices are often redesigned to make them easier to operate and easier to maintain. The shift control devices are coupled to a drive train having several gears, which are used on a bicycle in order to climb hills more easily, or to ride faster on flat ground. The shift control devices are each generally coupled to a shift mechanism such as a derailleur or an internally geared hub that is operated by a control cable.

There are many types of cable operated shift control devices currently being installed on bicycles. For example, some cable operated shift control devices have a pair of shift levers and a cable winding mechanism that rotates via a ratchet mechanism. With conventional cable operated shift control devices of this type, operation of one of the shift lever causes the cable winder to rotate via the ratchet mechanism in one direction by one gear. As a result, the cable is wound around the cable winder, and a shift is made by the shift mechanism from one gear to the next gear. Operation of the other shift lever causes the ratchet mechanism to be released and the cable winder to rotate in the other direction by one gear. As a result, the cable that was wound on the cable winder is played out, and a shift is made in the opposite direction by the shift mechanism.

Another example of a cable operated shift control device is a hand grip actuated shifter in which the hand grip rotates around the axis of the handlebar to rotate a cable take-up element. Thus, when the hand grip is rotated in one direction, the cable is wound around the take-up element to cause the derailleur or internal geared hub to shift from one gear to the next gear. Rotation of the hand grip in the other direction causes the cable to be unwound or played out so that the derailleur or internal geared hub shifts from one gear to the next gear.

One problem with these types of cable operated shift control devices is that the control cable sometimes breaks. Many of these shift control device have to be completely disassembled in order to replace the control cable. More recently, a maintenance hole has been provided for changing these control cables. These maintenance holes can allow dirt or other contaminants to enter the unit. Therefore, many control devices with maintenance holes have a plug for covering the hole. These plugs are typically separate parts that are prone to being lost. Moreover, often these plugs are difficult to remove without a tool.

In view of the above, there exists a need for an improved bicycle shift control device which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle shift control device with an access opening having a slideably maintenance cover for easy access to change the control cable.

The foregoing object can basically be attained by providing a cable operated bicycle shift control device that has an outer casing with a cable receiving bore and an access opening for accessing a cable operated winding mechanism to perform maintenance such as replacement of the cable. The cable operated winding mechanism is disposed in the outer casing such that its cable attachment point is disposed relative to the access opening to be accessible from the access opening. A maintenance cover slideably is coupled to the outer casing between a closed position overlying the access opening and an open position exposing the access opening.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
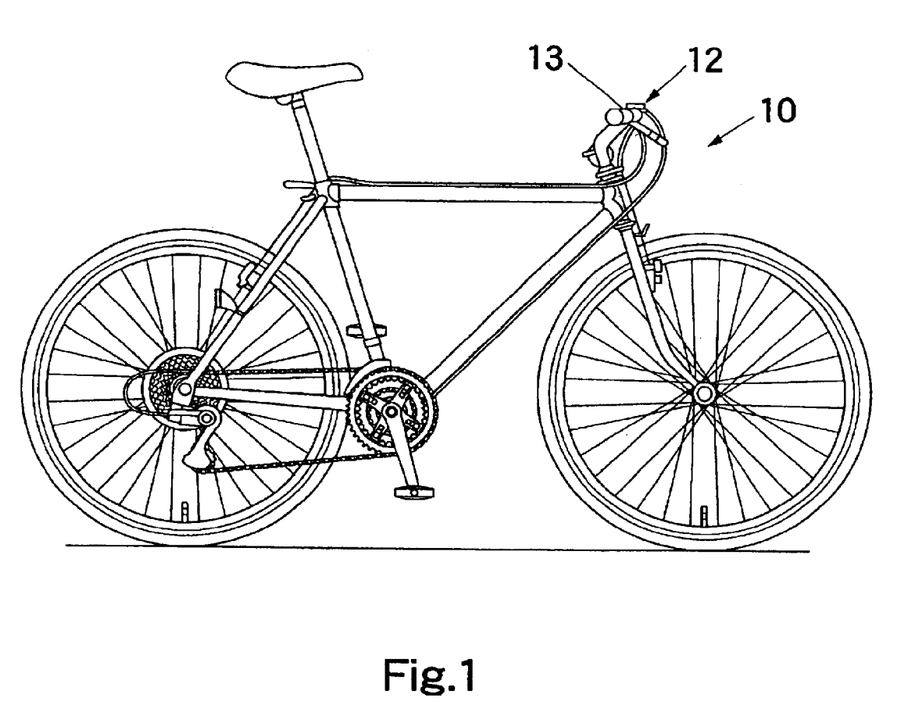
FIG. 1 is a side elevational view of a conventional bicycle with a bicycle shift control device coupled thereto in accordance with one embodiment of the present invention.
Figure 2:
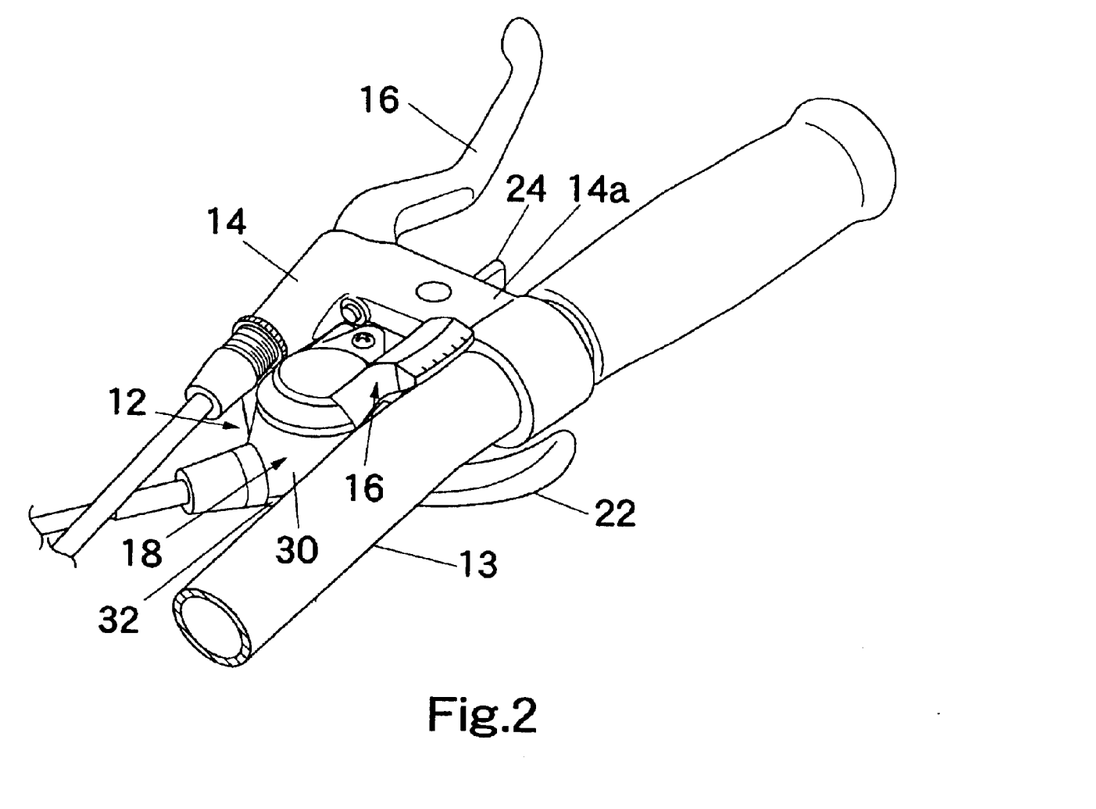
FIG. 2 is a perspective view of the shift control device in accordance with the present invention.
Figure 3:
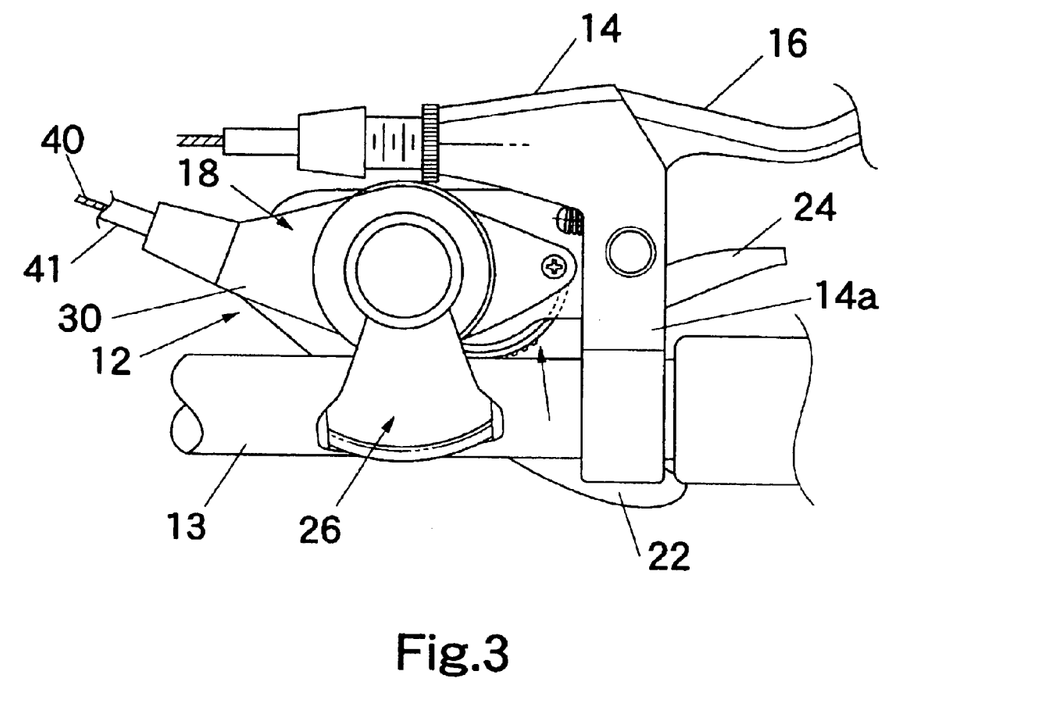
FIG. 3 is a top plan view of the shift control device in accordance with the embodiment illustrated in FIG. 2.

Referring initially to FIGS. 1 and 2, a conventional bicycle 10 is illustrated having a shift control device 12 coupled to the handlebar 13 of the bicycle 10 in accordance with one embodiment of the present invention. Bicycles and their various components are well known in the prior art, and thus, the bicycle 10 and its various components will not be discussed or illustrated in detail herein, except for the components that relate to the present invention. In other words, only the shift control device 12 and the components that relate thereto will be discussed and/or illustrated herein.

In the illustrated embodiment, as best seen in FIGS. 2–5, the shift control device 12 is part of an integrated shifting and braking unit. In other words, the shift control device 12 is fixedly coupled to a lever bracket 14 that pivotally supports a brake lever 16. Of course, it will be apparent to those skilled in the art from this disclosure that the shift control device 12 could be a separate unit from the brake lever 16. Moreover, it will be apparent to those skilled in the art from this disclosure that this invention could be utilized with other types of shift control devices such as a hand grip actuated shift control device.

The shift control device 12 basically includes an outer casing 18 having a cable operated winding mechanism 20 disposed in the outer casing 18, a pair of shift levers 22 and 24, and a gear indicator 26 operatively coupled to the cable operated winding mechanism 20.

The cable operated winding mechanism 20 and the gear indicator 26 are well known in the art. Thus, these parts will not be discussed or illustrated in detail herein. Moreover, it will be apparent to those skilled in the art from this disclosure that the precise structure of these parts is not crucial to the present invention. The illustrated embodiments of the cable operated winding mechanism 20 and the gear indicator 26 are disclosed in U.S. Pat. No. 5,701,786, assigned to Shimano Inc.

In the illustrated embodiment, the outer casing 18 is formed of four portions, i.e., a first or upper casing half 30 and a second or lower casing half 32 having a first lower casing portion 32a, a second lower casing portion 32b and a third lower casing portion 32c. The lower casing portions 32a–32c are fastened to the upper casing half 30 by a bolt 34 extending through the outer casing 18 and a nut 36 attached to an upper portion of the upper casing half 30. The upper casing half 30 is integrally formed with the lever bracket 14. Thus, when the upper and lower casing halves 30 and 32 are coupled together, the entire outer casing 18 is connected to the handlebar 13 through the mounting portion 14a of the lever bracket 14.

The shifting levers 22 and 24 and the cable operated winding mechanism 20 are attached to a support member 15 that is mounted within the outer casing 18 via the bolt 34 and the nut 36. The shifting levers 22 and 24 are interlocked to the cable operated winding mechanism 20 through a take-up element 38 and a known ratchet-type interlock mechanism. This interlock mechanism includes a ratchet type feed pawl (not shown) for transmitting a pivotal movement of a shift lever 22 to the take-up element 38, a positioning pawl (not shown) for returning the take-up element 38 in a predetermined rotational position, a limiter pawl (not shown) for limiting an unwinding rotation of the take-up element 38, and a release cam (not shown) for disengaging the positioning pawl from the take-up element 38.

Figure 4:
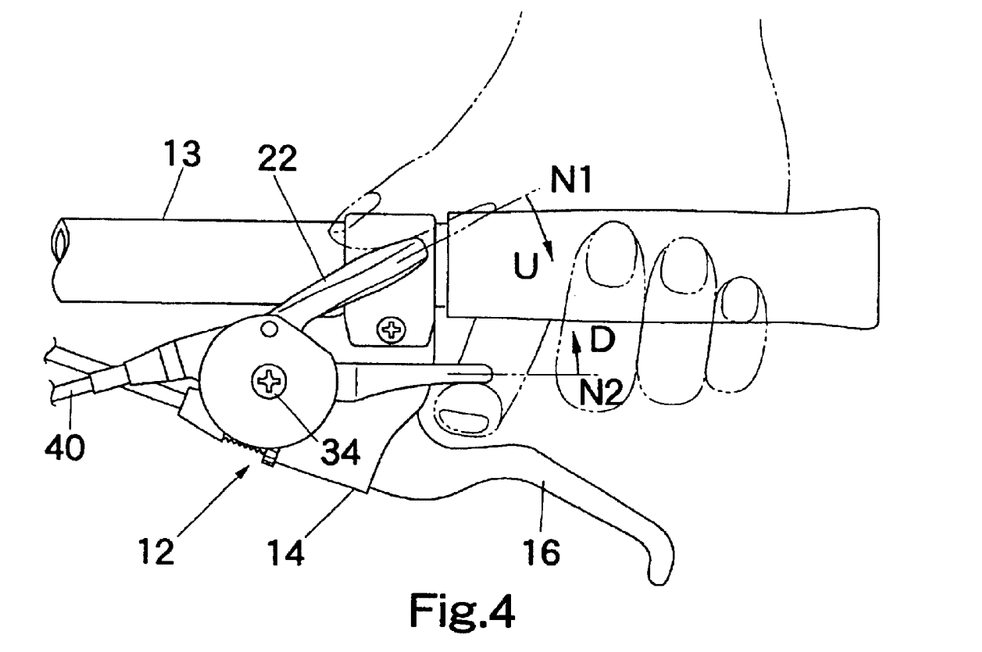
FIG. 4 is a bottom plan view of the shift control device in accordance with the embodiment illustrated in FIGS. 2 and 3.

By operating the shift levers 22 and 24, the take-up element 38 is rotated to pull or release an inner wire 40 of the control cable 41. For example, when the shift lever 22 is shifted in an upshift direction U from an original position N1, the take-up element 38 rotates in a winding direction to take up the inner wire 40 of the control cable 41 as seen in FIG. 4. The shift lever 22 can be released after being operated a predetermined amount necessary for effecting a gear change. Then, the shift lever 22 automatically returns to the original position under the biasing force of a return spring (not shown). At this time, despite the return to the original position of the shift lever 22, the take-up element 38 is retained in a position to which the take-up element 38 has been rotated by the shift lever 22 to complete the gear change. The shift lever 22 is shiftable in a downshift direction D from an original position N2 as seen in FIG. 4.

Thereafter, the shift lever 24 can be released to be returned to its original position by the biasing force of a return spring (not shown). Then, the take-up element 38 rotates by an angle of one pitch in the unwinding direction under the force of an unwind spring (not shown) and a restoring force of the shifting device (derailleur) provided by the inner wire 40. Consequently, the shift control device 12 unwinds the inner wire 40 of the control cable 41 to effect a one-stage gear shift.

Figure 5:
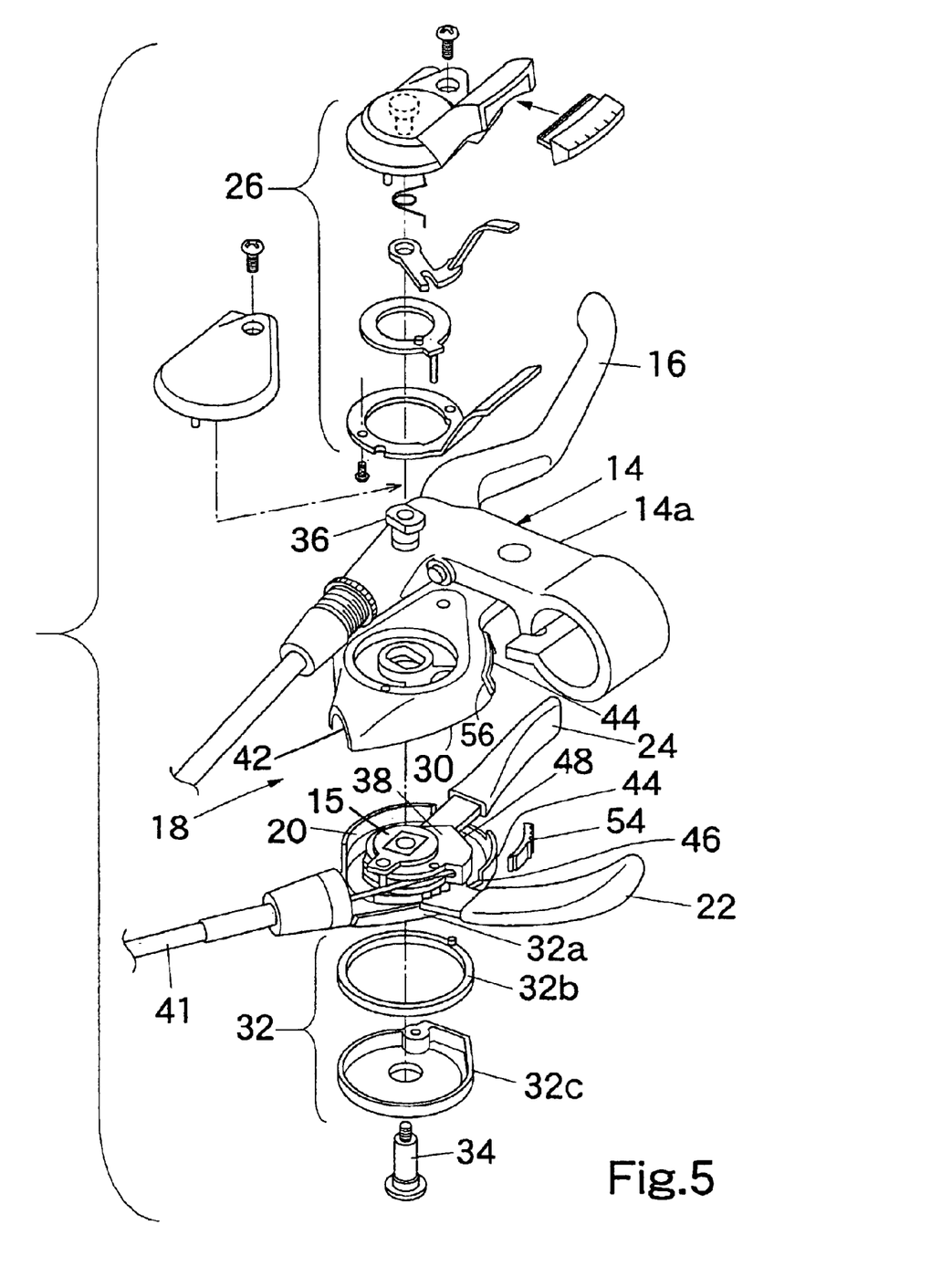
FIG. 5 is an exploded perspective view of the shift control device in accordance with the embodiment illustrated in FIGS. 2–4.
Figure 6:
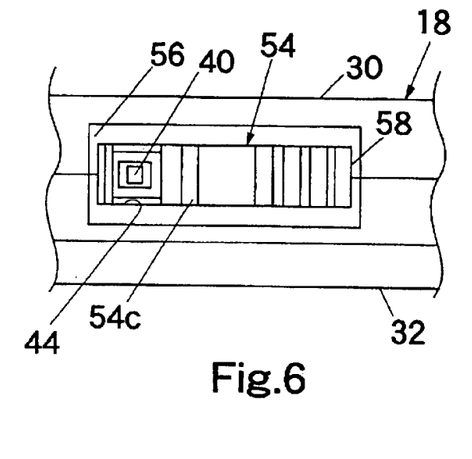
FIG. 6 is a partial side elevational view of the shift control device illustrated in FIGS. 2–5 with the maintenance cover in the closed position covering the access opening.
Figure 10:
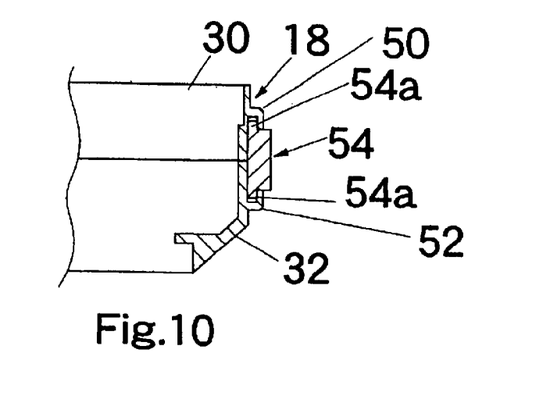
FIG. 10 is a cross sectional view of the shift control device illustrated in FIGS. 2–9 as seen along section line 10—10 of FIG. 7.

As best seen in FIG. 5, the outer casing 18 has a cable receiving bore 42 and an access opening 44 formed between the upper casing half 30 and the lower casing half 32 as well as a pair of shift lever openings 46 and 48 formed therebetween. As best seen in FIG. 10, the upper casing half 30 and the lower casing half 32 each includes curved L-shaped rails 50 and 52 that are vertically spaced apart to form a curved channel for slideably receiving a maintenance cover 54. The rails are located so that the maintenance cover 54 can slide between closed position overlying the access opening 44 and an open position exposing the access opening 44. The rails 50 and 52 are also provided with a stop 58 at one end to limit the movement of the maintenance cover 54.

Figure 7:
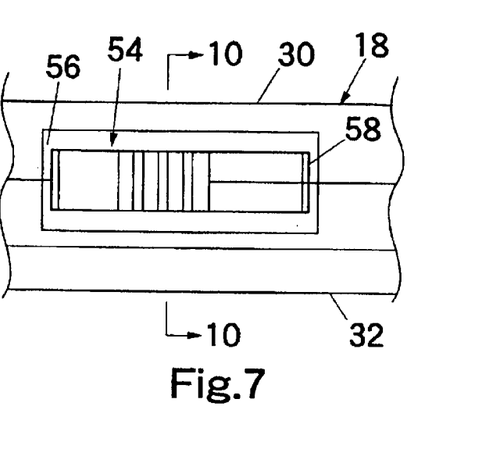
FIG. 7 is a partial side elevational view of the shift control device illustrated in FIGS. 2–5 with the maintenance cover in the open position exposing the access opening.
Figure 8:
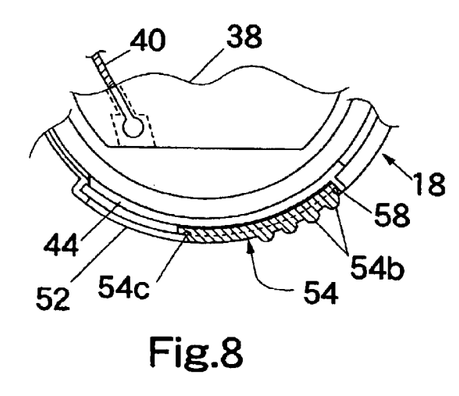
FIG. 8 is a partial top plan view of the shift control device illustrated in FIGS. 2–5 with the maintenance cover in the closed position covering the access opening.
Figure 9:
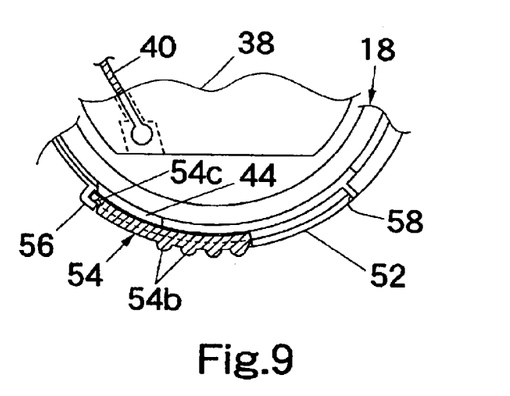
FIG. 9 is a partial top plan view of the shift control device illustrated in FIGS. 2–5 with the maintenance cover in the open position exposing the access opening.

As best seen in FIGS. 8 an 9, the maintenance cover 54 is a generally curved member having a curvature that conforms to the curvature of the outer surface of the outer casing 18. Preferably, as seen in FIG. 10, the maintenance cover 54 has a pair of guide edges 54a that are received between the rails 50 and 52 and the upper and lower casing halves 30 and 32 for slideably being received within the channel formed therebetween. As best seen in FIGS. 8 an 9, the maintenance cover 54 is provided with a plurality of ribs 54b that form a handle element, which is arranged to aid in moving the maintenance cover 54 between the closed and open positions. The ribs 54b that form the handle element are located at one end of the maintenance cover 54. The other or opposite end of the maintenance cover 54 is provided with a latching or locking arrangement that releasably locks the maintenance cover 54 in the closed position as seen in FIGS. 7 and 9.

In particular, the outer casing 18 and maintenance cover 54 include complementary retaining elements. Preferably, the maintenance cover 54 has a recess or notch 54c that forms a first complementary retaining element while the outer casing 18 includes a second complementary retaining element in the form of a latching element or portion 56. This latching element 56 can be a protrusion or merely edge portion of a part of the outer casing 18. Thus, the notch 54c engages the latching portion 56 of the upper and lower casings 30 and 32 to lock the maintenance cover 54 in the closed position. In particular, when the maintenance cover 54 is moved from the open position to the closed position, the end of the maintenance cover 54 with the notch 54c will slide underneath the latching portion 56 of the upper and lower casing halves 30 and 32 to releasably lock the maintenance cover 54 in the closed position. Preferably, this locking arrangement is accomplished by having the maintenance cover 54 being flexed slightly inwardly towards the access opening 44 such that the maintenance cover 54 is elastically deformed. This results in the maintenance cover 54 applying an outwardly directing force on the latches to hold the maintenance cover 54 in the closed position.

It will be apparent to those skilled in the art from this disclosure that the upper and lower casings 30 and 32 and the maintenance cover 54 can be constructed of a variety of materials. These materials include various plastics and metals.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle shift control device comprising:

an outer casing having an outer surface, a cable receiving bore and an access opening;

a cable operated winding mechanism disposed in said outer casing, said cable operated winding mechanism having a cable attachment point disposed relative to said access opening to be accessible from said access opening; and a maintenance cover movably coupled to said outer casing between a closed position overlying said access opening and an open position exposing said access opening, said maintenance cover being configured to move along an arcuate path substantially parallel to said outer surface of said outer casing between said closed position and said open position, said outer casing and said maintenance cover including a pair of complementary retaining elements that are arranged to releasably maintain said maintenance cover in said closed position with one of said complementary retaining elements being a recess formed in one of said outer casing and said maintenance cover and the other of said complementary retaining elements being a latching element.

2. A bicycle shift control device comprising:

an outer casing having a first complementary mounting structure, a cable receiving bore and an access opening;

a cable operated winding mechanism disposed in said outer casing, said cable operated winding mechanism having a cable attachment point disposed relative to said access opening to be accessible from said access opening; and a maintenance cover slidably coupled to said outer casing such that said maintenance cover slides on an outer surface of said outer casing between a fully closed position overlying said access opening in which said cable attachment point is non-accessible and a fully open position exposing said access opening such that said cable attachment point is accessible through said access opening in said fully open position, said maintenance cover being configured and arranged with a second complementary mounting structure that is slideably retained to said first complementary mounting structure to retain said maintenance cover to said outer casing in both said fully closed position and said fully open position, said outer casing and said maintenance cover including a pair of complementary retaining elements that are arranged to releasably maintain said maintenance cover in said fully closed position with one of said complementary retaining elements being a recess formed in one of said outer casing and said maintenance cover and the other of said complementary retaining elements being a latching element.

3. The bicycle shift control device according to claim 2, wherein said outer casing includes a channel with said maintenance cover slideably disposed in said channel.

4. A The bicycle shift control device according to claim 2, wherein said outer casing includes a first casing half and a second casing half that are fixedly coupled together.

5. A bicycle shift control device according to claim 4, wherein said access opening is partially formed in each of said first and second casing halves.

6. The bicycle shift control device according to claim 5, wherein said maintenance cover includes a handle element arranged to aid in sliding said maintenance cover between said fully closed position and said fully open position.

7. The bicycle shift control device according to claim 6, wherein said maintenance cover is curved.

8. The bicycle shift control device according to claim 1, wherein said outer casing includes a first casing half and a second casing half that are fixedly coupled together.

9. The bicycle shift control device according to claim 8, wherein said access opening is partially formed in each of said first and second casing halves.

10. The bicycle shift control device according to claim 1, wherein said maintenance cover includes a handle element arranged to aid in moving said maintenance cover between said closed position and said open position.

11. The bicycle shift control device according to claim 1, wherein said maintenance cover is curved.

12. The bicycle shift control device according to claim 2, wherein said maintenance cover includes a handle element arranged to aid in sliding said maintenance cover between said fully closed position and said fully open position.

13. A bicycle shift control device comprising:

an outer casing having a cable receiving bore and an access opening, said outer casing including a first casing half and a second casing half that are fixedly coupled together, each of said first and second casing halves including an outer surface with a rail coupled thereto;

a cable operated winding mechanism disposed in said outer casing, said cable operated winding mechanism having a cable attachment point disposed relative to said access opening to be accessible from said access opening; and a maintenance cover moveably coupled to said rails of said first and second casing halves between a closed position overlying said access opening in which said cable attachment point is non-accessible and an open position exposing said access opening such that said cable attachment point is accessible through said access opening in said open position, said outer casing and said maintenance cover including a pair of complementary retaining elements that are arranged to releasably maintain said maintenance cover in said closed position with one of said complementary retaining elements being a recess formed in one of said outer casing and said maintenance cover and the other of said complementary retaining elements being a latching element.

14. The bicycle shift control device according to claim 13, wherein said maintenance cover is slideably coupled to said outer casing between said closed position and said open position.

15. The bicycle shift control device according to claim 13, wherein said outer casing includes a channel with said maintenance cover slideably disposed in said channel.

* * * * *